(12) United States Patent
Itagaki et al.

(10) Patent No.: US 6,509,421 B2
(45) Date of Patent: *Jan. 21, 2003

(54) FLAME RETARDANT RESIN COMPOSITIONS

(75) Inventors: Akinari Itagaki, Usui-gun (JP); Masaaki Yamaya, Usui-gun (JP); Yoshiteru Kobayashi, Usui-gun (JP)

(73) Assignee: Shin-Etsu Chemical Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/797,877

(22) Filed: Mar. 5, 2001

(65) Prior Publication Data

US 2001/0018487 A1 Aug. 30, 2001

Related U.S. Application Data

(63) Continuation of application No. 09/440,708, filed on Nov. 16, 1999, now Pat. No. 6,326,425.

(30) Foreign Application Priority Data

Nov. 17, 1998 (JP) ............................................. 10-325778
Sep. 24, 1999 (JP) ............................................. 11-270398

(51) Int. Cl.[7] ............................ C08L 83/04; C08L 71/10
(52) U.S. Cl. ..................... 525/393; 524/267; 524/268; 525/100; 525/431; 525/446; 528/43
(58) Field of Search ................................. 524/267, 268; 525/431, 446, 393, 100; 428/43

(56) References Cited

U.S. PATENT DOCUMENTS

| | | | |
|---|---|---|---|
| 3,919,344 A | * 11/1975 | Merrill et al. | ......... 106/287.12 |
| 4,197,384 A | 4/1980 | Bialous et al. | |
| 4,265,801 A | 5/1981 | Moody et al. | |
| 4,387,176 A | 6/1983 | Frye | |
| 4,536,590 A | 8/1985 | Brown, Jr. | |
| 5,100,958 A | 3/1992 | Fuhr et al. | |
| 5,364,898 A | 11/1994 | Lee, Jr. et al. | |
| 5,431,765 A | * 7/1995 | Decker et al. | ........... 156/307.4 |
| 5,955,542 A | 9/1999 | Davis et al. | |
| 6,284,824 B1 | * 9/2001 | Iji et al. | ..................... 524/267 |
| 6,326,425 B1 | * 12/2001 | Itagaki et al. | ................ 524/268 |

FOREIGN PATENT DOCUMENTS

| | | |
|---|---|---|
| CA | 2042223 | 12/1991 |
| EP | 829521 | 3/1998 |
| JP | 54-36365 | 3/1979 |
| JP | 54-102352 | 8/1979 |
| JP | 59-500099 | 1/1984 |
| JP | 1-318069 | 12/1989 |
| JP | 4-226159 | 8/1992 |
| JP | 6-128434 | 5/1994 |
| JP | 6-306265 | 11/1994 |
| JP | 7-33971 | 2/1995 |
| JP | 8-176425 | 7/1996 |
| JP | 8-176427 | 7/1996 |
| JP | 9-169914 | 6/1997 |
| JP | 10-139964 | 5/1998 |

OTHER PUBLICATIONS

English Abstract for JP–A 7–33971.
English Abstract for JP–A 6–128434.
English Abstract for JP–A 8–176425.
English Abstract for JP–A 8–176427.
English Abstract for JP–A 9–169914.

* cited by examiner

*Primary Examiner*—Robert Dawson
*Assistant Examiner*—Marc S Zimmer
(74) *Attorney, Agent, or Firm*—Millen, White, Zelano & Branigan, P.C.

(57) ABSTRACT

To an aromatic ring-bearing synthetic resin such as an aromatic polycarbonate resin or aromatic epoxy resin is added a minor amount of an organopolysiloxane which contains phenyl radicals and monofunctional siloxane units in a molecule wherein the contents of alkoxy radicals and hydroxyl radicals are each set at less than 2% by weight. Molded parts of the resin composition are flame retardant, optically transparent, and recyclable for reuse.

23 Claims, No Drawings

FLAME RETARDANT RESIN COMPOSITIONS

This is a continuation of application Ser. No. 09/440,708 filed Nov. 16, 1999, now U.S. Pat. No. 6,326,425.

BACKGROUND OF THE INVENTION

1. Field of the Invention

This invention relates to flame retardant resin compositions based on synthetic resins containing aromatic rings in a molecule such as aromatic polycarbonate resins and aromatic epoxy resins.

2. Prior Art

Flame retardant resin compositions are often used in various products such as electric and electronic parts, building members, automotive parts, and daily goods. These resin compositions are generally made flame retardant by adding organic halogen compounds optionally in admixture with antimony trioxide. However, these flame retardant resin compositions have the drawback that harmful halogen gases evolve upon combustion.

It is also known that resin compositions can be made flame retardant by adding silicone resins which do not evolve harmful gases.

JP-A 54-36365 discloses a flame retardant resin composition wherein a silicon resin containing at least 80% by weight of trifunctional siloxane units is added to an organic resin. With respect to the organic resin, no reference is made to aromatic polycarbonate resins and aromatic epoxy resins. With a focus on the melt processing of the organic resin, a relatively high molecular weight silicone resin substantially free of crosslinking functional radicals and having a softening point above room temperature is selected. On account of a relatively weak flame retardant effect, the silicone resin must be added in a large amount of about 10 to 300 parts by weight per 100 parts by weight of the organic resin, detracting from the properties of the organic resin.

JP-A 59-500099, 4-226159, and 7-33971 disclose flame retardant resin compositions having added thereto silicone resins consisting of monofunctional siloxane units and tetrafunctional siloxane units. JP-A 6-128434 discloses a flame retardant resin composition having added thereto a silicone resin containing vinyl-bearing siloxane units. In order to exert a satisfactory flame retardant effect, all these compositions, however, require to increase the amount of silicone resin added or to additionally use inorganic fillers such as aluminum hydroxide, halogens or phosphorus compounds.

In most systems with silicone resins added, the amount of silicone resin added must be increased in order to achieve a satisfactory flame retardant effect, but at the sacrifice of the moldability and mechanical strength of resin compositions. Efforts have been made to develop silicone resin additives having greater flame retardant effect or additives capable of cooperating with silicone resins to improve the flame retardant effect.

JP-A 8-176425 discloses a flame retardant resin composition comprising a polycarbonate resin, an epoxy-bearing organopolysiloxane, and an alkali metal salt of an organic sulfonic acid. JP-A 8-176427 discloses a flame retardant resin composition comprising a polycarbonate resin, a polycarbonate resin modified with a phenolic hydroxyl-bearing organopolysiloxane, and an organic alkali metal salt. Further, JP-A 9-169914 discloses a composition wherein a petroleum heavy oil or pitch is combined with a silicone compound for improving flame retardance. These silicone resins having special organic functional radicals are expensive because of the complication of their preparation process, but do not achieve a sufficient flame retardant effect to compensate for the increased cost. In this regard, a further improvement is desired.

Also for improving the thermal oxidation resistance of polycarbonate resins, it is known effective to add a silicone resin having alkoxy functional radicals which can be introduced at a relative low cost. JP-A 54-102352 discloses a thermoplastic resin composition having added thereto a silicone resin containing alkoxy radicals as shown below.

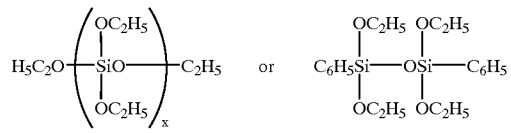

x is an integer of 2 to 10.

In general, siloxanes having a greater alkoxy content tend to form a network and provide a greater thermal oxidation resistance. The former silicone resin provides insufficient flame retardance because of the lack of phenyl radicals. The latter phenyl-bearing, low molecular weight organosiloxane is also insufficient in imparting flame retardance because of a substantial loss of effective components through vaporization by heat during melt processing or combustion.

JP-A 1-318069 discloses a powdery polymer mixture of an alkoxy or hydroxyl radical-bearing silicone resin and a thermoplastic polymer. JP-A 6-306265 discloses a flame retardant polycarbonate resin composition comprising a polycarbonate and an organic siloxane having alkoxy, phenyl and vinyl radicals introduced therein. The former requires the addition of halogen and phosphorus compounds because the silicone resin alone imparts insufficient flame retardance. In the latter composition, the siloxane contains as the alkoxy radicals lower alkoxy radicals such as methoxy which are so sensitive to hydrolysis that they form alcohols, detracting from the transparency of the resin composition.

In the recent years, there is an increasing demand to recycle various plastic materials for reuse. The above-mentioned silicone compounds having reactive radicals such as alkoxy, hydroxyl or epoxy radicals change their molecular structure during molding of resin compositions or during service of molded resin parts, due to the interaction between silicone compounds or with another component in the resin composition and under the influence of the service environment. As a result, many recycled materials become difficult to mold and some materials are even impossible to recycle.

JP-A 10-139964 discloses a flame retardant resin composition to which is added a silicone resin composed of di- and trifunctional siloxane units and having a weight average molecular weight of 10,000 to 270,000. It is described that a monofunctional siloxane unit represented by $R'_3SiO_{1/2}$ is introduced as a terminal radical wherein hydroxyl and/or alkoxy radicals preferably account for less than 10 mol % of the R' radicals. However, the contents of hydroxyl and alkoxy radicals in the molecule are not specified. Since a high molecular weight silicone resin is used, the composition is still insufficient in moldability and flame retardance.

There is a demand to have a flame retardant resin composition comprising an aromatic ring-bearing synthetic resin such as an aromatic polycarbonate resin or aromatic epoxy resin and a minor amount of a flame retardant whereby molded resin parts having improved flame retardance can be produced while maintaining the physical properties and optical transparency of the synthetic resin and the resin parts can be recycled for reuse.

SUMMARY OF THE INVENTION

An object of the invention is to provide a flame retardant resin composition having added thereto an organopolysiloxane substantially free of reactive radicals, which can be recycled for reuse, does not evolve harmful gases when burned by a fire or incinerated for disposal and is thus safe and imposes a little burden to the environment.

Another object of the invention is to provide a low-cost flame retardant resin composition wherein an organopolysiloxane of specific structure is selected from inexpensive organopolysiloxanes free of special organic functional radicals, so as to achieve a sufficient flame retardant effect even when added in minor amounts.

A further object of the invention is to provide a flame retardant resin composition wherein an organopolysiloxane of specific structure is used so that the moldability of the resin composition and the outer appearance, optical transparency and physical properties (mechanical strength) of molded parts thereof are little affected.

It has been found that by adding to a synthetic resin containing aromatic rings in a molecule such as an aromatic polycarbonate resin or aromatic epoxy resin, a minor amount of an organopolysiloxane which contains phenyl radicals as essential substituents attached to silicon atoms and monofunctional siloxane units as essential units in a molecule, wherein the content of alkoxy radicals in the molecule and the content of hydroxyl radicals involved as Si—OH radicals are each set at less than 2% by weight, there is obtained a resin composition which is given flame retardance and drip inhibition, maintains optical transparency, and can be recycled for reuse. Since high flame retardance is achieved without adding halogens, phosphorus and antimony, the composition does not evolve harmful gases when burned. Additionally, since the specific organopolysiloxane can impart a flame retardant effect even when added in a minor amount, the properties inherent to the aromatic ring-bearing synthetic resin are little affected.

Accordingly, the invention provides a flame retardant resin composition comprising (A) 100 parts by weight of a synthetic resin containing aromatic rings in a molecule, and (B) 0.1 to 10 parts by weight of an organopolysiloxane containing phenyl radicals as essential substituents attached to silicon atoms and siloxane units represented by $R^1R^2R^3SiO_{1/2}$ wherein $R^1$, $R^2$, and $R^3$ are independently selected from substituted or unsubstituted monovalent hydrocarbon radicals of 1 to 6 carbon atoms, the contents of alkoxy radicals and hydroxyl radicals available as Si—OH radicals in a molecule each being less than 2% by weight, the organopolysiloxane having a weight average molecular weight of up to 2,000.

DETAILED DESCRIPTION OF THE INVENTION

Component (A) of the resin composition according to the invention is a synthetic resin containing aromatic rings in a molecule. Resins prepared from aromatic compounds such as phenol, styrene, and phthalic acid are included. Typically, polystyrene resins, polycarbonate resins, polyphenylene oxide resins, acrylonitrile-butadiene-styrene resins, acrylonitrile-styrene resins, aromatic epoxy resins, and aromatic polyester resins are used, with the aromatic polycarbonate resins and aromatic epoxy resins being preferred.

The aromatic polycarbonate resins may be prepared by reacting a dihydric phenol with phosgene or carbonate diester. The dihydric phenol is preferably selected from bisphenols, with 2,2-bis(4-hydroxyphenyl)propane being especially preferred. It is acceptable to partially or entirely replace 2,2-bis(4-hydroxyphenyl)propane by another dihydric phenol. The dihydric phenols other than 2,2-bis(4-hydroxyphenyl)propane include, for example, hydroquinone, 4,4-dihydroxyphenyl, bis(4-hydroxyphenyl)-sulfide, bis(4-hydroxyphenyl)sulfone, and bis(4-hydroxyphenyl)ketone. There may be used homopolymers of these dihydric phenols alone or copolymers of two or more of these dihydric phenols or blends thereof.

The aromatic epoxy resins are synthetic resins having at least two epoxy radicals in a molecule which can be cured with various curing agents. Prior art well-known epoxy resins are useful. Examples include novolac type epoxy resins, triphenolalkane type epoxy resins, dicyclopentadiene-phenol novolac resins, phenolaralkyl type epoxy resins, glycidyl ester type epoxy resins, alicyclic epoxy resins, and heterocyclic epoxy resins. Epoxy resins with a biphenyl skeleton having a low melt viscosity are preferred, and they are combined with other epoxy resins if desired.

Component (B) is an organopolysiloxane which contains phenyl radicals as essential substituents attached to silicon atoms and monofunctional siloxane units represented by $R^1R^2R^3SiO_{1/2}$ as essential units in a molecule. The phenyl radicals dominate the dispersibility and compatibility of the organopolysiloxane in the aromatic ring-bearing synthetic resin and are necessary to improve the flame retardance, moldability and transparency of the resin composition. The monofunctional siloxane units represented by $R^1R^2R^3SiO_{1/2}$ are used for the purposes of blocking the terminus of an organopolysiloxane molecule and reducing the contents of reactive hydroxyl and alkoxy radicals.

Here, $R^1$, $R^2$, and $R^3$ may be the same or different and are selected from substituted or unsubstituted monovalent hydrocarbon radicals of 1 to 6 carbon atoms. Exemplary are alkyl radicals such as methyl, ethyl, propyl, butyl, hexyl, and cyclohexyl, alkenyl radicals such as vinyl and allyl, and aryl radicals such as phenyl. Methyl and phenyl are especially preferred.

In order that the resin composition be recycled for reuse and maintain satisfactory moldability as well as outer appearance and transparency of molded parts, the organopolysiloxane should have minimized contents of reactive radicals in the molecule as previously described. For this reason, the content of alkoxy radicals and the content of hydroxyl radicals available as Si—OH radicals in the molecule should be set below certain levels, respectively.

Specifically, the organopolysiloxane used herein requires that the content of alkoxy radicals in a molecule be less than 2% by weight. The alkoxy radicals in the organopolysiloxane are effective for controlling drip during combustion, but undesirable from the standpoint of moisture resistance in that when the flame retardant resin composition is kept in high humidity conditions, alkoxy radicals undergo hydrolysis with the water pick-up to form alcohol, which can detract from the transparency of molded parts. Additionally, Si—OH radicals formed as a result of hydrolysis adversely affect the moldability on recycled use. By restricting the content of alkoxy radicals in a molecule to less than 2% by weight so that the amount of alkoxy radicals participating in hydrolytic reaction is minimized, molded parts are drastically improved in moisture resistance and transparency.

From the standpoints of hydrolytic reaction of alkoxy radicals and flame retardance, it is further preferable that the residual alkoxy radicals be secondary and/or tertiary alkoxy radicals of 3 to 6 carbon atoms selected from isopropoxy, 2-butoxy, tert-butoxy, and cyclohexyloxy radicals.

Similarly, the content of hydroxyl radicals available as Si—OH radicals in a molecule should be set at less than 2% by weight, and preferably 1% by weight or less. If the hydroxyl content is 2% by weight or more, condensation reaction between Si—OH radicals is likely to occur during melt mixing of the aromatic ring-bearing synthetic resin with the organopolysiloxane, so that the organopolysiloxane is increased in molecular weight. The increased molecular weight of organopolysiloxane impedes dispersion to detract from the transparency and impact strength of the resin composition, obstructs surface migration during combustion to detract from flame retardance, and exacerbates the moldability on recycle working, disabling recycle use. In this regard, it is especially preferable to restrict the hydroxyl content to 1% by weight or less.

The lower the contents of alkoxy radicals and hydroxyl radicals available as Si—OH radicals, the better become the results. From the manufacturing standpoint, however, it is difficult to reduce the contents to zero.

The organopolysiloxane containing phenyl radicals and having the contents of alkoxy radicals and hydroxyl radicals (available as Si—OH radicals) in the molecule each reduced to less than 2% by weight is essentially non-reactive and highly heat resistant so that it may not substantially change its structure in the temperature range of up to 350° C., ensuring that the flame retardant resin composition is recycled for reuse. The organopolysiloxane does not evolve harmful gases when burned.

The organopolysiloxane (B) has a weight average molecular weight of up to 2,000. If the weight average molecular weight is too low, the content of low molecular weight polymer components becomes higher so that when the organopolysiloxane is melt mixed with the aromatic ring-bearing synthetic resin, more components might volatilize off the system, failing to achieve the flame retardant effect. From this standpoint, it is recommended that the organopolysiloxane have a weight average molecular weight of from 410 to 2,000 and especially from 500 to 2,000.

Despite the absence of reactive radicals other than the residual hydroxyl radicals and alkoxy radicals, the organopolysiloxane can impart flame retardance to the resin composition when added in minor amounts of up to 10% by weight based on the composition. It is believed that when the composition is burned, the organopolysiloxane having phenyl radicals and the aromatic ring-bearing synthetic resin readily form a nonflammable Si—C ceramic layer due to coupling of aromatic rings in both the components, exerting an outstanding flame retardant effect.

The content of phenyl radicals in the organopolysiloxane largely affects the moldability of the resin composition and the transparency and mechanical strength of molded parts. As the phenyl content increases, the organopolysiloxane becomes more dispersible in and compatible with the aromatic ring-bearing synthetic resin so that molding may become easier and molded parts may have higher transparency and mechanical strength.

Accordingly, in order that the above-mentioned flame retarding mechanism work effectively and the moldability of resin compositions and the transparency and mechanical strength of molded parts be kept satisfactory, it is recommended that the phenyl radicals account for 30 to 90% by weight of the entire organic substituents attached to silicon atoms in the organopolysiloxane molecule. The phenyl content referred to herein is defined as follows. Provided that the organopolysiloxane (B) is represented by the average compositional formula (1):

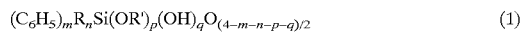

$(C_6H_5)_m R_n Si(OR')_p (OH)_q O_{(4-m-n-p-q)/2}$ (1)

wherein R stands for organic substituents other than phenyl and alkoxy, typically substituted or unsubstituted monovalent hydrocarbon radicals of 1 to 6 carbon atoms, and R' stands for monovalent hydrocarbon radicals of 1 to 6 carbon atoms, the phenyl content is given by the following equation.

Phenyl content (wt %) = $\{MW(C_6H_5)xm\}/\{MW(C_6H_5)xm + MW(R)xn + MW(R')xp\} \times 100$ MW is the molecular weight of the associated substituent.

In the preferred embodiment of the invention, the phenyl content as defined above is in the range of 30 to 90% by weight. If the phenyl content is too low, the organopolysiloxane would become less compatible with and less dispersible in the aromatic ring-bearing synthetic resin, adversely affecting the moldability of resin compositions and the transparency and impact strength of molded parts. The low phenyl content also leads to a reduced flame retardant effect. On the other hand, if the phenyl content is too high, the organopolysiloxane would become highly compatible with the aromatic ring-bearing synthetic resin and lose surface migration during combustion, also resulting in a reduced flame retardant effect. More preferably, the phenyl content is in the range of 50 to 90% by weight.

It is noted that in formula (1), R is preferably an alkyl radical, especially methyl, and R' is also preferably an alkyl radical, especially secondary or tertiary alkyl radical of 3 to 6 carbon atoms. The letters m, n, p, and q are preferably positive numbers satisfying: $0.5 \leq m \leq 2.0$, $0.1 \leq n \leq 2.3$, $0 \leq p \leq 0.13$, $0 \leq q \leq 0.17$, and $0.92 \leq m+n+p+q \leq 2.85$.

The organopolysiloxane (B) used herein may be one containing in its molecule, 10 to 75 mol % of monofunctional siloxane units represented by $R^1 R^2 R^3 SiO_{1/2}$, 0 to 80 mol % of difunctional siloxane units represented by $R^4 R^5 SiO_{2/2}$, 0 to 80 mol % of trifunctional siloxane units represented by $R^6 SiO_{3/2}$, and 0 to 15 mol % of tetrafunctional siloxane units represented by $SiO_{4/2}$, and more preferably, 20 to 70 mol % of monofunctional siloxane units represented by $R^1 R^2 R^3 SiO_{1/2}$, 0 to 80 mol % of difunctional siloxane units represented by $R^4 R^5 SiO_{2/2}$, 0 to 80 mol % of trifunctional siloxane units represented by $R^6 SiO_{3/2}$, and 0 to 10 mol % of tetrafunctional siloxane units represented by $SiO_{4/2}$.

Herein $R^1$, $R^2$, $R^3$, $R^4$, $R^5$, and $R^6$ may be the same or different and are selected from substituted or unsubstituted monovalent hydrocarbon radicals of 1 to 6 carbon atoms. Exemplary are alkyl radicals such as methyl, ethyl, propyl, butyl, hexyl, and cyclohexyl, alkenyl radicals such as vinyl and allyl, and aryl radicals such as phenyl. Methyl and phenyl are especially preferred.

In general, the structure of organopolysiloxane has an arbitrary combination of monofunctional siloxane units (M units), difunctional siloxane units (D units), trifunctional siloxane units (T units), and tetrafunctional siloxane units (Q units). The preferred combinations of these units used herein are M/D, M/T, M/D/T, M/D/Q, M/T/Q, and M/D/T/Q systems, with the M/D/T system being especially preferred because of better flame retardance and dispersibility. On the other hand, a single M system does not exert a flame retardant effect because of the too low molecular weight. An M/Q system is sometimes less dispersible in the aromatic ring-bearing synthetic resin because of the excessively inorganic nature. For the same reason, in the M/D/Q and M/D/T/Q systems, the content of Q units should preferably be limited to 15 mol % or less, and more preferably 10 mol % or less.

It is preferable from the standpoints of ease of preparation and cost that the organopolysiloxane (B) contain only methyl radicals as the organic substituents other than the phenyl radicals and residual alkoxy radicals. Namely, in average composition formula (1), R is methyl.

According to the invention, the organopolysiloxane (B) should be used in an amount of 0.1 to 10 parts, and preferably 0.2 to 5 parts by weight per 100 parts by weight of the aromatic ring-bearing synthetic resin (A). Less than 0.1 part of the organopolysiloxane is too small to provide a flame retardant effect whereas more than 10 parts of the organopolysiloxane does not further improve the flame retardant effect and rather adversely affects the mechanical properties such as impact strength.

The organopolysiloxanes used herein may be prepared by well-known methods. One exemplary method is by reacting a phenyl radical-containing organochlorosilane(s) with water, the amount of water being determined as appropriate in accordance with the molecular structure and molecular weight of an end organopolysiloxane. The organic solvent if any, by-produced hydrochloric acid and low-boiling fractions are removed, leaving an organopolysiloxane containing phenyl radicals and monofunctional siloxane units. The monofunctional siloxane units can be introduced by reacting a triorganochlorosilane with a partial condensate from the initial stage of hydrolysis or at the end of hydrolysis. It is also possible to react a hexaorganodisiloxane with a partial condensate at the end of hydrolysis wherein an acid catalyst (e.g., hydrochloric acid or sulfuric acid) or base catalyst (e.g., potassium hydroxide or sodium hydroxide) is preferably used. It is also preferable to block the residual alkoxy radicals and hydroxyl radicals appearing as Si—OH radicals using various silylating agents such as hexaorganodisilazane, with no particular limit being imposed on the silylating agent used.

An alternative method starts with a phenyl radical-containing alkoxysilane. Water is added to the alkoxysilane for hydrolytic reaction to take place, the amount of water being also determined as appropriate in accordance with the molecular structure and molecular weight of an end organopolysiloxane. Here, acid catalysts (e.g., hydrochloric acid and acetic acid) or base catalysts (e.g., ammonia and sodium hydroxide) are preferably used. Upon removal of impurities such as alcohol by-product, the organopolysiloxane is obtained. Monofunctional siloxane units can be introduced by the same means as above. In either method, the content of phenyl radicals, the contents of respective siloxane units, and the molecular weight can be properly tailored by adjusting the type and amount of reactants.

Better flame retardance is sometimes obtained when organic alkali metal salts, organic alkaline earth metal salts or mixtures thereof such as sodium diphenylsulfone-3-sulfonate and sodium perfluoroalkanesulfonates are added to the flame retardant resin composition of the invention. These salts function as a carbonization accelerator for promoting formation of an incombustible Si—C ceramic layer by mutual coupling of aromatic rings, and any of salts known of such function may be used. An appropriate amount of the salt added is 0.001 to 5 parts by weight per 100 parts by weight of the aromatic ring-bearing synthetic resin (A). Less than 0.001 part of the salt is ineffective for its purpose whereas more than 5 parts of the salt would adversely affect the outer appearance and strength of molding. Illustrative examples are sodium benzenesulfonate, disodium naphthalene-2,6-disulfonate, sodium diphenyl-sulfone-3-sulfonate, and sodium perfluorobutanesulfonate.

In the flame retardant resin composition of the invention, an inorganic filler may be blended as a reinforcement. Examples of the filler include silicas such as fused silica and crystalline silica, alumina, silicon nitride, aluminum nitride, boron nitride, titanium oxide, and glass fibers. No particular limits are imposed on the mean particle size and shape of the inorganic filler although spherical fused silica having a mean particle size of 5 to 40 $\mu$m is especially preferred from the molding and flowing standpoints. An appropriate amount of the inorganic filler is about 400 to about 1,200 parts by weight per 100 parts by weight of the aromatic ring-bearing synthetic resin (A). Less than 400 parts of the filler would be less effective for reinforcement whereas more than 1,200 parts of the filler can adversely affect moldability. In order to enhance the bond strength between the synthetic resin and the inorganic filler, it is preferred to use the inorganic filler which has been surface treated with coupling agents such as silane coupling agents and titanate coupling agents. Exemplary coupling agents include epoxysilanes such as $\gamma$-glycidoxypropyltrimethoxysilane, $\gamma$-glycidoxypropylmethyldiethoxysilane, and $\beta$-(3,4-epoxycyclohexyl)ethyltrimethoxysilane, aminosilanes such as N-$\beta$-(aminoethyl)-$\gamma$-aminopropyltrimethoxysilane, $\gamma$-aminopropyltriethoxysilane, and N-phenyl-$\gamma$-aminopropyltrimethoxysilane, and mercaptosilanes such as $\gamma$-mercaptopropyltrimethoxysilane. The amount of coupling agent used and the surface treating method are not critical.

In the flame retardant resin composition according to the invention, any of well-known additives may be blended, if necessary, for example, antioxidants, neutralizing agents, UV absorbers, antistatic agents, pigments, dispersants, lubricants, thickeners, drip inhibitors (such as fluoro-resins), stress-reducing agents, waxes, and coloring agents.

In preparing the composition of the invention, the above essential and optional components are metered and mixed using equipment and methods commonly used in the manufacture of prior art rubber and plastic compositions. More particularly, the components are fully mixed and dispersed by an agitating mixer such as a ribbon blender or Henschel mixer, and the mixture is further kneaded in a melt kneader such as a Banbury mixer or extruder, thereby obtaining the desired composition.

In molding the composition of the invention, any of well-known molding methods such as injection molding, extrusion molding, compression molding and vacuum forming may be used.

EXAMPLE

Preparation Examples and Examples of the invention are given below together with Comparative Examples by way of illustration and not by way of limitation.

For each of the organopolysiloxanes obtained in Preparation Examples, the content (% by weight) of phenyl radicals based on the entire organic substituents was calculated according to the following equation using the data of NMR analysis.

Phenyl content (wt %)=$\{MW(C_6H_5)xm\}/\{MW(C_6H_5)xm+MW(R)xn+MW(R')xp\} \times 100$ The content (% by weight) of alkoxy radicals in the entire molecule was determined from the data of NMR analysis.

The content (% by weight) of hydroxyl radicals available as Si—OH radicals in the entire molecule was determined by reacting a predetermined amount of the organopolysiloxane with a methyl Grignard reagent in accordance with the Grignard method, and quantitatively determining the amount of methane gas evolved. The weight average molecular weight was determined by plotting for conversion GPC measurement data on the calibration line obtained from a polystyrene standard sample. Mw is a weight average molecular weight.

Preparation Example 1

A 2-liter flask equipped with a stirrer, condenser and thermometer was charged with 423 g (2 mol) of phenyltrichlorosilane, 434 g (4 mol) of trimethylchlorosilane, and 194 g of toluene. A dropping funnel was charged with a mixture of 108 g (6 mol) of water and 30 g (0.5 mol) of isopropanol, which was added dropwise to the flask over one hour with stirring. Hydrolytic condensation reaction was proceeded while removing out of the system hydrogen chloride gas evolving during the reaction. After the completion of dropwise addition, stirring was continued for a further one hour for ripening while heating the flask at an internal temperature of 60° C. in an oil bath. Subsequently, the excess of water, unreacted isopropanol, hydrogen chloride and toluene were removed by vacuum distillation, yielding 490 g of a liquid phenyl-containing organopolysiloxane No. 1.

Preparation Example 2

The procedure of Preparation Example 1 was repeated except that the 2-liter flask was charged with 212 g (1 mol) of phenyltrichlorosilane, 253 g (1 mol) of diphenyldichlorosilane, 326 g (3 mol) of trimethylchlorosilane, and 190 g of toluene, and the dropping funnel was charged with a mixture of 90 g (5 mol) of water and 30 g (0.5 mol) of isopropanol before hydrolytic condensation reaction took place. There was obtained 480 g of a liquid phenyl-containing organopolysiloxane No. 2.

Preparation Example 3

The procedure of Preparation Example 1 was repeated except that the 2-liter flask was charged with 212 g (1 mol) of phenyltrichlorosilane and 759 g (3 mol) of diphenyldichlorosilane, and the dropping funnel was charged with a mixture of 63 g (3.5 mol) of water and 180 g (3 mol) of isopropanol before hydrolytic condensation and alkoxylation reaction took place. Thereafter, 324 g (4 mol) of hexamethyldisiloxane and 120 g of 20% hydrochloric acid in water were added to the flask which was stirred for a further one hour at an internal temperature of 40° C. to effect de-alkoxylation and silylation reaction. There was obtained 810 g of a liquid phenyl-containing organopolysiloxane No. 3.

Preparation Examples 4–10

A series of organopolysiloxanes, Nos. 4 to 10, were prepared by following the procedure of Preparation Example 1 while changing the type of organochlorosilanes and alcohol used, and the amounts (molar ratio) of organochlorosilanes, water and alcohol charged.

The physical properties of the organopolysiloxanes, Nos. 1 to 10, obtained in Preparation Examples 1 to 10 are shown in Table 1.

TABLE 1

| Organopoly-siloxane | Phenyl content (wt %) | Alkoxy radical | Alkoxy content (wt %) | Hydroxyl content (wt %) | Mw | Siloxane unit content (mol %) | | | |
|---|---|---|---|---|---|---|---|---|---|
| | | | | | | M | D | T | Q |
| 1 | 48 | isopropoxy | 1.2 | 0.4 | 660 | 67 | 0 | 33 | 0 |
| 2 | 65 | isopropoxy | 1.0 | 0.3 | 620 | 60 | 20 | 20 | 0 |
| 3 | 81 | isopropoxy | 1.6 | 0.3 | 1270 | 43 | 43 | 14 | 0 |
| 4 | 75 | isopropoxy | 0.8 | 0.4 | 1900 | 26 | 63 | 11 | 0 |
| 5 | 61 | isopropoxy | 1.3 | 0.7 | 850 | 35 | 35 | 25 | 5 |
| 6 | 0 | isopropoxy | 1.1 | 0.5 | 550 | 60 | 20 | 20 | 0 |
| 7 | 92 | methoxy | 3.0 | 0.6 | 1300 | 25 | 65 | 10 | 0 |
| 8 | 63 | methoxy | 5.8 | 0.7 | 920 | 0 | 75 | 25 | 0 |
| 9 | 68 | methoxy | 1.8 | 3.1 | 1160 | 40 | 45 | 15 | 0 |
| 10 | 76 | methoxy | 0.1 | 3.9 | 23500 | 0 | 20 | 80 | 0 |

Examples 1–6 & Comparative Examples 1–6

Compositions were prepared by adding 3 parts by weight of an organopolysiloxane to 100 parts by weight of an aromatic polycarbonate resin or 10 parts by weight of an organopolysiloxane to 100 parts by weight of an aromatic epoxy resin in accordance with the combination shown in Table 2, premixing the ingredients in an automatic mortar, and melt kneading the premix in a single screw extruder at a temperature of 280° C.

The polycarbonate (PC) resin used was Calibre® 200-20 having a viscosity average molecular weight of about 20,000 commercially available from Dow-Sumitomo K.K. The epoxy resin used was YX4000HK having an epoxy equivalent of 190 commercially available from Yuka Shell K.K. plus an equal weight of a phenolic resin curing agent XL-225-3L having a phenol equivalent of 168 commercially available from Mitsui Toatsu Chemical K.K.

The compositions were examined for flame retardance, optical transparency, and recyclability.

Test bars of 1/16 inch thick were molded from the compositions and examined for flame retardance in accordance with the test procedure set forth in Underwriters' Laboratories, Inc. Bulletin 94, Burning test for Classifying Materials (hereinafter referred to as UL-94).

The optical transparency was measured by means of a visible absorption spectrophotometer. Using a molded plate of 10 mm thick, a visible light transmittance across a light path length of 10 mm in the thickness direction was measured. The transmittance of a sample was divided by the transmittance of a control sample free of organosiloxane, giving a percent transmittance. Samples were rated "Pass"

when the percent transmittance was 70% or higher and "Reject" when the percent transmittance was less than 70%.

The recyclability was evaluated by again adding 1 part by weight of the organopolysiloxane to 100 parts by weight of the aromatic polycarbonate resin composition which had been once molded as above. The mixture was melt kneaded and molded into a plate. The outer appearance of the plate was visually observed and rated "OK" when molding was satisfactory as the virgin and "Reject" when the outer appearance was non-uniform or the shape was defective.

The results are shown in Table 2.

TABLE 2

|     | Synthetic resin | Organopoly- siloxane | UL-94 rating | Transmittance | Recyclability |
|-----|-----------------|----------------------|--------------|---------------|---------------|
| E1  | PC              | No. 1                | V-0          | Pass          | OK            |
| E2  | PC              | No. 2                | V-0          | Pass          | OK            |
| E3  | PC              | No. 3                | V-0          | Pass          | OK            |
| E4  | PC              | No. 4                | V-0          | Pass          | OK            |
| E5  | PC              | No. 5                | V-0          | Pass          | OK            |
| E6  | Epoxy           | No. 2                | V-0          | Pass          | —             |
| CE1 | PC              | No. 6                | V-2          | Reject        | Reject        |
| CE2 | PC              | No. 7                | V-2          | Pass          | Reject        |
| CE3 | PC              | No. 8                | V-1          | Reject        | Reject        |
| CE4 | PC              | No. 9                | V-1          | Reject        | Reject        |
| CE5 | PC              | No. 10               | V-2          | Reject        | Reject        |
| CE6 | PC              | none                 | burned       | Pass          | —             |

The resin composition comprising an aromatic ring-bearing synthetic resin and an organosiloxane containing phenyl radicals and monofunctional siloxane units is rendered flame retardant without the risk of evolving harmful gases when burned, while parts molded therefrom maintain optical transparency and are recyclable.

Japanese Patent Application Nos. 10-325778 and 11-270398 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A flame retardant resin composition comprising
   (A) 100 parts by weight of a synthetic resin containing phenyl rings, and
   (B) 0.1 to 10 parts by weight of an organopolysiloxane containing phenyl radicals attached to silicon atoms and containing in its molecule 10 to 75 mol % of siloxane units represented by $R^1R^2R^3SiO_{1/2}$, 0 to 80 mol % of siloxane units represented by $R^4R^5SiO_{2/2}$, 11 to 80 mol % of siloxane units represented by $R^6SiO_{3/2}$, and 0 to 15 mol % of siloxane units represented by $SiO_{4/2}$, wherein $R^1$, $R^2$, $R^3$, $R^4$, $R^5$ and $R^6$ are independently selected from substituted or unsubstituted monovalent hydrocarbon radicals of 1 to 6 carbon atoms, the contents of alkoxy radicals and hydroxyl radicals available as Si—OH radicals in a molecule each being less than 2% by weight, said organopolysiloxane having a weight average molecular weight of up to 2,000.

2. The resin composition of claim 1 wherein the organopolysiloxane (B) has a weight average molecular weight of 410 to 2,000.

3. The resin composition of claim 1 wherein in the organopolysiloxane (B), the phenyl radicals account for 30 to 90% by weight of the entire organic substituents attached to silicon atoms in the molecule.

4. The resin composition of claim 1 wherein in the organopolysiloxane (B), the residual alkoxy radicals are secondary or tertiary alkoxy radicals of 3 to 6 carbon atoms or both.

5. The resin composition of claim 1 wherein in the organopolysiloxane (B), organic substituents attached to silicon atoms other than the phenyl radicals and residual alkoxy radicals are all methyl.

6. The resin composition of claim 1 wherein the synthetic resin (A) is an aromatic polycarbonate resin or aromatic epoxy resin.

7. A flame retardant resin composition according to claim 1, wherein the residual alkoxy radicals are isopropoxy, 2-butoxy, tert-butoxy, or cyclohexyloxy radicals.

8. A flame retardant resin composition according to claim 1, wherein the synthetic is a polystyrene resin, a polycarbonate resin, a polyphenylene oxide resin, an acrylonitrile-butadiene-styrene resin, an acrylonitrile-styrene resin, a phenyl epoxy resin or a phenyl polyester resin.

9. A flame retardant resin composition according to claim 1, wherein the substituted or unsubstituted monovalent hydrocarbon radicals are alkyl radicals, alkenyl radicals, or aryl radicals.

10. A flame retardant resin composition according to claim 9, wherein the alkyl radicals are methyl, ethyl, propyl, butyl, hexyl, or cyclohexyl.

11. A flame retardant resin composition according to claim 9, wherein the alkenyl radicals vinyl or allyl.

12. A flame retardant resin composition according to claim 9, wherein the aryl radicals is phenyl.

13. A flame retardant resin composition according to claim 1, wherein the content of hydroxyl radicals is not more that 1% by weight.

14. A flame retardant resin composition according to claim 1, wherein in the organopolysiloxane (B), the phenyl radicals account for 50 to 90% by weight of the entire organic substituents attached to silicon atoms in the molecule.

15. A flame retardant resin composition according to claim 1, wherein $R^6$ is methyl, ethyl, propyl, butyl, hexyl, cyclohexyl, vinyl, allyl, or phenyl.

16. A flame retardant resin composition according to claim 1, further comprising an organic alkali metal salt, an organic alkaline earth metal salt or a mixture thereof.

17. A flame retardant resin composition according to claim 1, further comprising sodium diphenylsulfone-3-sulfonate and sodium perfluoroalkanesulfonate.

18. A flame retardant resin composition according to claim 1, further comprising an inorganic filler.

19. A flame retardant resin composition according to claim 1, further comprising an antioxidant, a neutralizing agent, an UV absorber, an antistatic agent, a pigment, a dispersant, a lubricant, a thickener, a drip inhibitor, a stress-reducing agent, a wax, or a coloring agent.

20. A flame retardant resin composition comprising
   (A) 100 parts by weight of a synthetic resin prepared from a phenyl compound, and
   (B) 0.1 to 10 parts by weight of an organopolysiloxane containing phenyl radicals attached to silicon atoms and containing in its molecule 10 to 75 mol % of siloxane units represented by $R^1R^2R^3SiO_{1/2}$, 0 to 80 mol % of siloxane units represented by $R^4R^5SiO_{2/2}$, 11 to 80 mol % of siloxane units represented by $R^6SiO_{3/2}$, and 0 to 15 mol % of siloxane units represented by $SiO_{4/2}$, wherein $R^1$, $R^2$, $R^3$, $R^4$, $R^5$ and $R^6$ are independently selected from substituted or unsubstituted monovalent hydrocarbon radicals of 1 to 6 carbon atoms, the contents of alkoxy radicals and hydroxyl radicals available as Si—OH radicals in a molecule each being less than 2% by weight, said organopolysiloxane having a weight average molecular weight of up to 2,000.

21. A flame retardant resin composition comprising
(A) 100 parts by weight of a synthetic resin containing phenyl rings, and
(B) 0.1 to 10 parts by weight of an organopolysiloxane containing phenyl radicals attached to silicon atoms and siloxane units represented by $R^1R^2R^3SiO_{1/2}$ wherein $R^1$, $R^2$, and $R^3$ are independently selected from substituted or unsubstituted monovalent hydrocarbon radicals of 1 to 6 carbon atoms, and 11 to 80 mol % of siloxane units represented by $R_6SiO_{3/2}$ wherein $R^6$ is selected from substituted or unsubstituted monovalent hydrocarbon radicals of 1 to 6 carbon atoms, the contents of alkoxy radicals and hydroxyl radicals available as Si—OH radicals in a molecule each being less than 2% by weight, said organopolysiloxane having a weight average molecular weight of up to 2,000, wherein in the organopolysiloxane (B), the residual alkoxy radicals are secondary or tertiary alkoxy radicals of 3–6 carbon atoms or both.

22. A flame retardant resin composition comprising
(A) 100 parts by weight of a synthetic resin containing phenyl rings, and
(B) 0.1 to 10 parts by weight of an organopolysiloxane containing phenyl radicals attached to silicon atoms and siloxane units represented by $R^1R^2R^3SiO_{1/2}$ wherein $R^1$, $R^2$, and $R^3$ are independently selected from substituted or unsubstituted monovalent hydrocarbon radicals of 1 to 6 carbon atoms, and 11 to 80 mol % of the siloxane units represented by $R_6SiO_{3/2}$ wherein $R^6$ is selected from substituted or unsubstituted monovalent hydrocarbon radicals of 1 to 6 carbon atoms, the contents of alkoxy radicals and hydroxyl radicals available as Si—OH radicals in a molecule each being less than 2% by weight, said organopolysiloxane having a weight average molecular weight of up to 2,000, wherein the residual alkoxy radicals are isopropoxy, 2-butoxy, tert-butoxy, or cyclohexyloxy radicals.

23. A flame retardant resin composition comprising
(A) 100 parts by weight of a synthetic resin containing phenyl rings, and
(B) 0.1 to 10 parts by weight of an organopolysiloxane containing phenyl radicals attached to silicon atoms and siloxane units represented by $R^1R^2R^3SiO_{1/2}$ wherein $R^1$, $R^2$, and $R^3$ are independently selected from substituted or unsubstituted monovalent hydrocarbon radicals of 1 to 6 carbon atoms, and 11 to 80 mol % of the siloxane units represented by $R_6SiO_{3/2}$ wherein $R^6$ is selected from substituted or unsubstituted monovalent hydrocarbon radicals of 1 to 6 carbon atoms, the contents of alkoxy radicals and hydroxyl radicals available as Si—OH radicals in a molecule each being less than 2% by weight, said organopolysiloxane having a weight average molecular weight of up to 2,000, further comprising sodium diphenylsulfone-3-sulfonate and sodium perfluoroalkanesulfonate.

* * * * *